May 29, 1962 R. W. CREBER 3,036,848
FLEXIBLE COUPLING MEANS FOR STANCHIONS
Filed Nov. 9, 1959
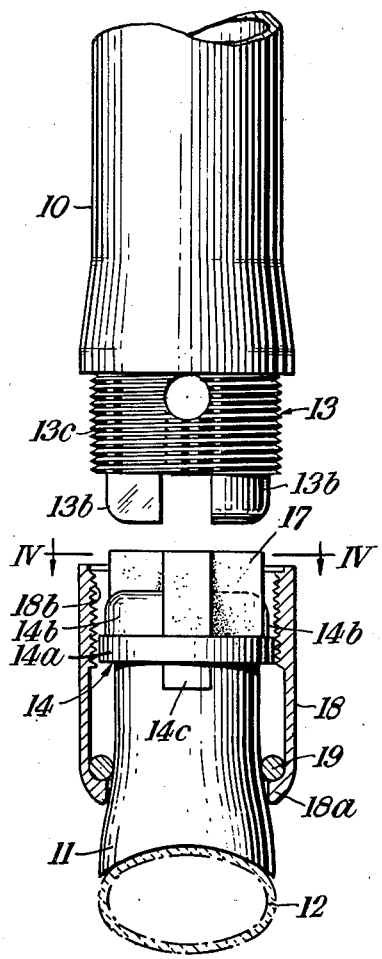
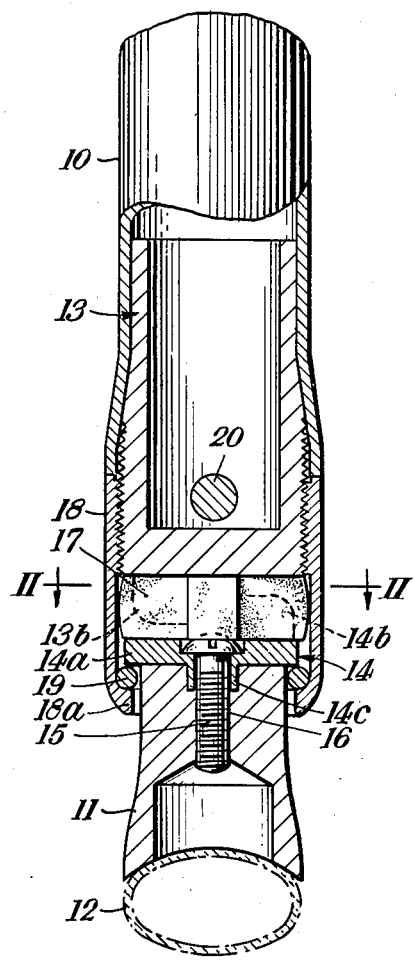
Fig. 3.
Fig. 1.
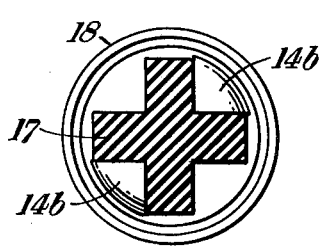
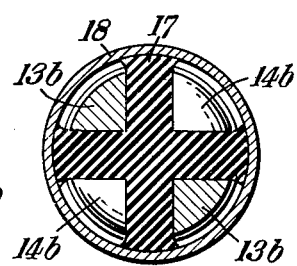
Fig. 4.
Fig. 2
INVENTOR
Ronald Walter Creber
By Ooms, McDougall, Williams & Hersh
Attorneys

United States Patent Office 3,036,848
Patented May 29, 1962

3,036,848
FLEXIBLE COUPLING MEANS FOR
STANCHIONS
Ronald Walter Creber, North Harrow, England, assignor
to G. Beaton & Son Limited, London, England, a British company
Filed Nov. 9, 1959, Ser. No. 851,732
12 Claims. (Cl. 287—105)

The invention relates to improved flexible coupling means for stanchions. Stanchions and grab rails used in motor passenger vehicles frequently form connections between parts of such vehicles which are subject to slight relative movement due to racking of the vehicle whilst travelling. For this reason it is usual to incorporate in the joint between the stanchion and the part to which it is connected resilient means which will permit of slight relative movement between the stanchion and said part. In omnibuses and like vehicles however, stanchions may be subjected to considerable torque due to standing passengers gripping and swinging on the stanchions during rapid acceleration or braking of the vehicle, causing the stanchions to twist and their coupling means to become loosened. The object of the present invention is to provide an improved flexible stanchion coupling in which undue twisting of the stanchion is prevented.

According to the invention flexible coupling means for connecting the end of a stanchion to another member comprise two axially engageable toothed clutch elements respectively adapted for fixing to the end of said stanchion and to said member, a torque resisting member of elastic material having radial projections adapted to separate the clutch teeth of the respective clutch elements and having a thickness in an axial direction greater than the length of said teeth, and means for drawing said elements axially together to compress said torque resisting member between them.

The above coupling means have the advantage that they provide a firm support for a stanchion and are capable of accommodating any slight relative movement between the stanchion and the member to which it is fixed.

In order that the invention may be more readily understood, reference will be made to the accompanying drawings which illustrate by way of example a preferred embodiment thereof.

In the drawings:

FIG. 1 is a sectional view of a flexible coupling means shown connecting a stanchion to a projection on the grab rail of a seat, FIG. 2 is a section on the line II—II of FIG. 1, FIG. 3 is a similar view to FIG. 1 but with the coupling means uncoupled and said stanchion spaced apart from the projection on the grab rail, FIG. 4 is a sectional view on the line IV—IV of FIG. 3.

In motor omnibuses it is usual to fit a stanchion between the deck head and a grab rail mounted on the back of a seat and the drawings show a coupling means for connecting such a stanchion to a projection on said grab rail.

Referring to the drawings it will be seen that the stanchion 10 is tubular whilst the end of the projection 11 on the grab rail 12 is solid. One of the aforesaid clutch elements comprises a plug 13 arranged to fit within the slightly flared end of the stanchion 10 to which it is secured by riveting or other means. The other of the clutch elements 14, see FIG. 3, is formed with a circular base plate 14a which projects radially outwards beyond the periphery of the projection 11. The element 14 is also formed on the underside of the plate 14a with a dog 14c which engages in a transverse slot in the upper end of the projection 11 and prevents relative rotation between the element 14 and projection 11. The clutch element 14 is firmly attached to the projection 11 by means of a screw 15 which engages with a threaded central hole 16 in the projection 11.

The clutch elements 13 and 14 are provided with two axially extending dogs or teeth 13b and 14b respectively. These teeth are substantially triangular in cross section and arranged symmetrically on the outer end face of each clutch element near the circumference thereof. The said teeth on each element are of such size and shape that each side face of one tooth is substantially parallel with a side face of the other tooth, each element at its centre having a clear space between the teeth as can be seen in FIGS. 2 and 4.

Before assembling the stanchion tube 10 on the grab rail 12 one or other of said elements 13 or 14 is fitted with a torque resisting member 17 of rubber or other elastic material. The said torque member 17 is of cruciform shape so that two opposite arms thereof fit between the teeth on one element, whilst the two remaining arms fit between the teeth on the other element, when the coupling is assembled. The torque member 17 is of a thickness greater than the axial length of said teeth so that it can be compressed to a predetermined extent without the ends of the teeth on one element coming into engagement with the other element.

The elements forming the clutch are drawn together by a sleeve 18. This sleeve 18 is provided at its lower end with an inwardly directed flange 18a and is fitted loosely over the projection 11 on the grab rail 12 before the clutch element 14 thereon is fitted and secured. The sleeve 18 is provided with a washer 19 of resilient material which seats on said flange 18a. As already mentioned the base plate 14a of the element 14 projects radially outwards so that it can be engaged by the washer 19 on the flange 18a of the sleeve 18.

The upper end of the sleeve 18 is provided with an internal screw thread 18b which is adapted to co-operate with a thread 13c on the lower end of the plug 13 in the stanchion tube 10, thus when the teeth on each element 13 and 14 and the torque member 17 are mated together, the whole assembly can be drawn together by screwing the sleeve 18 on to the stanchion 10, the sleeve 18 being screwed up until the rubber torque member 17 is compressed.

In order to prevent the said sleeve 18 from being unscrewed unintentionally due to relative movement between the stanchion 10 and the seat to which it is secured, the element 13 in the end of the stanchion may be secured by a pin 20 of plastic or like material, which projects level with the outside of the said screw thread. The screwing of the sleeve 18 on to the stanchion 10 cuts a thread in the ends of said pin 20 and the friction between the material of the pin and the sleeve serves to lock the sleeve on the stanchion.

When the coupling is tightened a firm joint is obtained, metal to metal surfaces at the coupling are eliminated, but slight flexing of the coupling due to pressure on the back of the seat or racking of the vehicle is permitted.

What I claim as my invention and desire to secure by Letters Patent is:

1. Flexible coupling means for connecting the end of a stanchion to another member comprising two axially engageable toothed clutch elements respectively adapted for fixing to the end of said stanchion and to said member and each having two axially extending teeth substantially triangular in cross section and arranged symmetrically on the outer end face of each element near the periphery thereof, a torque resisting member of elastic material having radial projections adapted to separate the teeth on one element from the teeth on the other element and having a thickness in an axial direction greater than the length of said teeth, and means holding said elements axially together and compressing said torque resisting member between them.

2. Flexible coupling means as claimed in claim 1 in which the teeth on each element are spaced from the centre thereof and are of such size and shape that each side face of one tooth is substantially parallel with a side face of the other tooth.

3. Flexible coupling means as claimed in claim 2 in which said torque resisting member is of cruciform shape, two opposite arms thereof being adapted to be fitted between the teeth on one clutch element and the two remaining arms thereof being adapted to be fitted between the teeth on the other clutch element.

4. Flexible coupling means for connecting the end of a stanchion to another member comprising two axially engageable toothed clutch elements respectively adapted for fixing to the end of said stanchion and to said member, and each having two axially extending teeth substantially triangular in cross section and arranged symmetrically on the outer end face of each element near the periphery thereof, a torque resisting member of elastic material and cruciform shape having a thickness in an axial direction greater than the length of said teeth, two opposite arms of said member being adapted to be fitted between the teeth on one clutch element and the two remaining arms thereof being adapted to be fitted between the teeth on the other cluch element, and means holding said elements axially together and compressing said torque resisting member between them.

5. Flexible coupling means as claimed in claim 4 in which said torque resisting member is constructed of rubber.

6. Flexible coupling means for connecting the end of a stanchion to another member comprising two axially engageable toothed clutch elements respectively adapted for fixing to the end of said stanchion and to said member, a torque resisting member of elastic material having radial projections adapted to separate the clutch elements and having a thickness in an axial direction greater than the length of said teeth, and a sleeve having at one end an inwardly directed flange adapted to engage with the peripheral part of one of said elements and at the other end an internal screw thread adapted to engage with a co-operating screw thread on the part to which said other element is fixed, said sleeve holding said elements axially together and compressing said torque resisting member between said elements.

7. Flexible coupling means as claimed in claim 6 in which the internal screw thread in said sleeve is adapted to engage with a co-operating thread on the stanchion and said flange on said sleeve is adapted to engage with the clutch element fixed to said other member.

8. A flexible coupling for connecting the end of a stanchion to another member comprising two axially engageable toothed clutch elements respectively fixed to the end of said stanchion and to said member, a torque resisting member of elastic material having radial projections separating the clutch elements and having a thickness in an axial direction greater than the length of said teeth, a sleeve having at one end an inwardly directed flange coopertaing with an outwardly directed flange on one of said elements and at the other end an internal screw thread engaging with a co-operating screw thread on the said other element, said sleeve holding said elements axially together and compressing said torque resisting member between them, a resilient spacing washer supported on the inwardly directed flange of said sleeve, said washer being located between said inwardly and outwardly directed flanges thereby serving to permit relative movement therebetween.

9. Flexible coupling means as claimed in claim 8 in which the thread on the stanchion is provided with a plastic insert engaging the threads on said sleeve.

10. Flexible coupling means for connecting the end of a stanchion to another member comprising two axially engageable toothed clutch elements one of which is formed as a plug adapted to fit in the end of a stanchion tube and the other of which includes a circular base plate formed on its underside with a dog adapted to engage in a transverse slot in the end of a projection on the grab rail of a chair frame, a torque resisting member of elastic material having radial projections adapted to separate the clutch elements and having a thickness in an axial direction greater than the length of said teeth, and means for drawing said elements axially together to compress said torque resisting member between them.

11. Flexible coupling means for connecting the end of a stanchion to another member comprising two axially engageable toothed clutch elements respectively adapted for fixing to the end of said stanchion and to said member, a torque resisting member of elastic material having radial projections adapted to separate the clutch elements and having a thickness in an axial direction greater than the length of the teeth on said elements, a sleeve having at one end an internal screw thread adapted to engage with a cooperating screw thread on one of said elements, and at the other end an inwardly directed flange supporting a spacing washer of resilient material adapted to cooperate with an outwardly directed flange on said other element, for drawing said elements axially together to compress said torque resisting member between them, said inwardly directed flange being spaced from said other element to permit of axial misalignment between said stanchion and said other element.

12. Flexible coupling means for connecting the end of a stanchion to another member comprising two axially engageable toothed clutch elements one of which is formed as a plug adapted to fit in the end of a stanchion tube, and the other of which includes a base plate adapted to be secured to the end of a projection on the grab rail of a chair frame, a torque resisting member of elastic material having radial projections adapted to separate the clutch elements and having a thickness in an axial direction greater than the length of said teeth, a sleeve having at one end an inwardly directed flange adapted to cooperate with an outwardly directed flange on one end of said base plate and at the other end an internal screw thread adapted to engage with a cooperating screw thread on the said plug for drawing said base plate and plug axially together to compress said torque member between them, the inwardly directed flange on said sleeve supporting a spacing washer of resilient materail, the arrangement being such that on said plug and base plate being drawn axially together, said washer is located between said inwardly and outwardly directed flanges and serves to permit of axial misalignment therebetween.

References Cited in the file of this patent

UNITED STATES PATENTS

| | | |
|---|---|---|
| 1,417,432 | Walker | May 23, 1922 |
| 1,438,751 | Des Isles | Dec. 12, 1922 |
| 1,517,761 | Sorensen et al. | Dec. 2, 1924 |
| 2,171,078 | Cline | Aug. 29, 1939 |
| 2,211,164 | Rippenbein | Aug. 13, 1940 |
| 2,438,530 | Woodling | Mar. 30, 1948 |
| 2,539,887 | Boots | Jan. 30, 1951 |
| 2,570,224 | Fason | Oct. 9, 1951 |
| 2,608,229 | Brutus | Aug. 26, 1952 |
| 2,716,334 | Scott et al. | Aug. 30, 1955 |